US012450757B1

(12) United States Patent
Zhang et al.

(10) Patent No.: US 12,450,757 B1
(45) Date of Patent: Oct. 21, 2025

(54) METHOD AND SYSTEM FOR OBTAINING FLUID FLOW DIRECTIONS OF TUNDISH WATER MODEL

(71) Applicants: North China University of Technology, Beijing (CN); University of Science and Technology Beijing, Beijing (CN); Northeastern University, Shenyang (CN)

(72) Inventors: Lifeng Zhang, Beijing (CN); Haojian Duan, Beijing (CN); Dinghan Li, Shenyang (CN); Ying Ren, Beijing (CN)

(73) Assignees: North China University of Technology, Beijing (CN); University of Science and Technology Beijing, Beijing (CN); Northeastern University, Shenyang (CN)

( * ) Notice: Subject to any disclaimer, the term of this patent is extended or adjusted under 35 U.S.C. 154(b) by 0 days.

(21) Appl. No.: 19/009,062

(22) Filed: Jan. 3, 2025

(30) Foreign Application Priority Data

Jan. 12, 2024 (CN) .......................... 202410048945.4

(51) Int. Cl.
G06T 7/254 (2017.01)
G06T 7/246 (2017.01)

(52) U.S. Cl.
CPC .............. *G06T 7/254* (2017.01); *G06T 7/246* (2017.01); *G06T 2207/10016* (2013.01); *G06T 2207/10024* (2013.01); *G06T 2207/20224* (2013.01)

(58) Field of Classification Search
CPC ..................... G06T 7/254; G06T 7/246; G06T 2207/20224; G06T 2207/10024; G06T 2207/10016
See application file for complete search history.

(56) References Cited

FOREIGN PATENT DOCUMENTS

| CN | 103336143 A | 10/2013 |
| CN | 111311695 A | 6/2020 |
| CN | 117333558 A | 1/2024 |

OTHER PUBLICATIONS

Huang et al., "Modeling of Flow Behaviors in a Swirling Flow Tundish for the Deep Cleaning of Molten Steel," Steel Res. Int. 2021, 92, 2100012. (Year: 2021).*

(Continued)

*Primary Examiner* — Kenny A Cese
(74) *Attorney, Agent, or Firm* — Pilloff Passino & Cosenza LLP; Rachel Pilloff; Sean Passino

(57) ABSTRACT

A method and a system for obtaining fluid flow directions of a tundish water model are provided, and the method includes the following steps: building the tundish water model with a preset similarity ratio with a tundish prototype; carrying out an ink diffusion experiment in the tundish water model, and shooting a video of an ink diffusion process; carrying out a binarization processing on the video of the ink diffusion process frame by frame to obtain binarized images; obtaining a time grayscale map based on grayscale values of the binarized images; obtaining a velocity vector map of the tundish water model based on grayscale gradients of the time grayscale map; and obtaining a moving direction of the ink based on the velocity vector map, and obtaining a flowing direction of fluid in the tundish water model based on the moving direction.

5 Claims, 19 Drawing Sheets

(56) References Cited

OTHER PUBLICATIONS

Zhao Gen-An, et al., Influence of scale factor of water model of steel ladles on mixing time measurement error, China Metallurgy, vol. 31, No. 2, pp. 24-30, Date of issue: Feb. 28, 2021. (abstract translated) doi: 10.13288/j.boyuan.issn1006-9356.20200386 Claims involved: 1-5.
Anawat Harnsihacacha et al, Anawat Harnsihacacha, et al., Physical water model and CFD studies of fluid flow in a single strand tundish, Materials Today: Proceedings 5, 9220-9228, Date of issue: Dec. 31, 2018. Claims involved: 1-5.
Retrieval report dated May 31, 2024 in SIPO application No. 202410048945.4.
Notification to Grant Patent Right for Invention dated Jun. 5, 2024 in SIPO application No. 202410048945.4.

* cited by examiner

METHOD AND SYSTEM FOR OBTAINING FLUID FLOW DIRECTIONS OF TUNDISH WATER MODEL

CROSS-REFERENCE TO RELATED APPLICATIONS

This application claims priority to Chinese Patent Application No. 202410048945.4, filed on Jan. 12, 2024, the contents of which are hereby incorporated by reference.

TECHNICAL FIELD

The disclosure belongs to the technical field of steel metallurgy and steelmaking, and particularly relates to a method and a system for obtaining fluid flow directions of a tundish water model.

BACKGROUND

Tundish is a connecting container between ladle and mold, which plays an important role in the process of continuous casting, such as diversion, continuous casting, protection and inclusion removal. Water model experiment of tundish is the most convenient and direct method to study the flow characteristics, and predecessors have done a lot of research in this field. At present, there are two methods to obtain tundish flow field through water model experiment, one is Laser Doppler Anemometry (LDA), and the other is Particle Image Velocimetry (PIV). Both PIV and LDA may only be applied to blank tundish or tundish with turbulence suppressor. The presence of dams and weirs will cause laser scattering and deviation, which will affect the measurement.

Image processing is a technique to digitally process and analyze images by computer to achieve the desired results. In the field of iron and steel metallurgy, dyeing experiment of the water model can clearly reveal the flow of fluid in the metallurgical reactors. However, current dyeing experiments of water model are mostly qualitative discussions, and the research on the fluid movement direction in tundish water model needs to be further explored, and there is no developed method to obtain the fluid flow directions by combining image processing with dyeing experiments of water model in the prior art.

SUMMARY

The disclosure aims at solving the shortcomings of the prior art, and provides a simple, rapid and low-cost method and system for obtaining fluid flow directions of a tundish water model.

In order to achieve the above objectives, the present disclosure provides the following schemes.

A method for obtaining fluid flow directions of a tundish water model, including following steps:
building the tundish water model with a preset similarity ratio with a tundish prototype;
carrying out an ink diffusion experiment in the tundish water model, and shooting a video of an ink diffusion process;
carrying out a binarization processing on the video of the ink diffusion process frame by frame to obtain binarized images;
obtaining a time grayscale map based on grayscale values of the binarized images;
obtaining a velocity vector map of the tundish water model based on grayscale gradients of the time grayscale map; and
obtaining a moving direction of the ink based on the velocity vector map, and obtaining a flowing direction of a fluid in the tundish water model based on the moving direction.

Optionally, the preset similarity ratio includes a preset geometric similarity ratio and a preset dynamic similarity ratio;
the preset geometric similarity ratio enables geometric dimensions of the tundish prototype and the tundish water model to meet a preset ratio; and
the preset dynamic similarity ratio enables Froude numbers of the tundish prototype and the tundish water model to be the same.

Optionally, a formula of the preset dynamic similarity ratio is as follows:

$$Fr_m = \frac{v_m^2}{g_m L_m} = \frac{v_p^2}{g_p L_p} = Fr_p,$$

in the formula, v is fluid velocity; g is acceleration of gravity; L is characteristic length; m stands for the tundish water model, p stands for the tundish prototype, and Fr is Froude number.

Optionally, a binarization processing is carried out on the video of the ink diffusion process frame by frame, and a method for obtaining the binarized images is as follows:
obtaining a frame at a moment before adding ink in the video of the ink diffusion process;
subtracting RGB values of each frame at a moment after adding the ink from RGB values of the frame at the moment before adding the ink to obtain RGB results;
obtaining images with background removed based on a range value of RGB and the RGB results;
re-obtaining ink distribution maps at different moments based on the images with the background removed; and
assigning values to different grayscale areas in the ink distribution maps at different moments based on a preset grayscale threshold to obtain the binarized images;

Optionally, based on the grayscale values of the binarized images, a method for obtaining the time grayscale map is as follows:
concentrating the binarized images of the ink distribution maps at different moments on an image according to grayscale values increasing with time to obtain the time grayscale map.

Optionally, a method for obtaining the moving direction of the ink based on grayscale gradients of the time grayscale map is as follows:
carrying out finite splitting on pixels of the time grayscale map to obtain a plurality of grids;
calculating a grayscale average value of each of the grids;
based on the grayscale average value, adopting a principle of minimum grayscale gradient, and obtaining a grid with a minimum grayscale value as a first grid within a preset grid range;
comparing grayscale gradients of a grid opposite to the first grid to obtain a grid with a smallest grayscale gradient with the first grid as a second grid; and
connecting an arrow between the first grid and the second grid to obtain the moving direction of the ink, and a flowing direction of fluid in the tundish water model is obtained based on the moving direction.

The disclosure also provides a system for obtaining fluid flow directions of a tundish water model, where the system is used for realizing the method, including:

a model building module, used for building a tundish water model with a preset similarity ratio with a tundish prototype;

a diffusion experiment module, used for carrying out an ink diffusion experiment in the tundish water model, and shooting a video of an ink diffusion process;

a binarization processing module, used for carrying out a binarization processing on the video of the ink diffusion process frame by frame to obtain binarized images;

a grayscale module, used for obtaining a time grayscale map based on grayscale values of the binarized images;

a velocity vector map obtaining module, used for obtaining a velocity vector map of the tundish water model based on grayscale gradients of the time grayscale map; and an ink moving direction obtaining module, used for obtaining a moving direction of the ink based on the velocity vector map, and obtaining the fluid flow directions in the tundish water model based on the moving direction.

Optionally, the binarization processing module includes:

a frame obtaining unit, used for obtaining a frame at a moment before adding ink in the video of the ink diffusion process;

an RGB obtaining unit, used for subtracting RGB values of each frame at a moment after adding the ink from RGB values of the frame at the moment before adding the ink to obtain RGB results;

a background removing unit, used for obtaining images with background removed based on a range value of RGB and the RGB results;

an ink distribution map obtaining unit, used for re-obtaining ink distribution maps at different moments based on the images with the background removed; and a binarization unit, used for assigning values to different grayscale areas in the ink distribution maps at different moments based on a preset grayscale threshold to obtain the binarized images.

Compared with the prior art, the disclosure has the following beneficial effects.

The disclosure includes the following steps: building the tundish water model with a preset similarity ratio with a tundish prototype; carrying out an ink diffusion experiment in the tundish water model, and shooting a video of an ink diffusion process; carrying out a binarization processing on the video of the ink diffusion process frame by frame to obtain binarized images; obtaining a time grayscale map based on grayscale values of the binarized images; obtaining a velocity vector map of the tundish water model based on grayscale gradients of the time grayscale map; it can be seen that the disclosure combines digital image processing with ink experiment, and obtains the vector map of the tundish water model according to the direction of the smallest grayscale gradient of the grayscale map, so as to accurately and efficiently obtain the fluid flow directions of the tundish water model; the disclosure may simply, conveniently, quickly and economically obtain the vector map and fluid flow directions of the tundish water model under different working conditions, and may also be used for other metallurgical vessels such as mold, providing technical support for the flow measurement of metallurgical vessels.

BRIEF DESCRIPTION OF THE DRAWINGS

In order to explain the technical scheme of the present disclosure more clearly, the drawings needed in the embodiments are briefly introduced below. Obviously, the drawings in the following description are only some embodiments of the present disclosure. For the ordinary technicians in this field, other drawings may be obtained according to these drawings without paying creative labor.

DETAILED DESCRIPTION OF THE EMBODIMENTS

In the following, the technical schemes in the embodiments of the disclosure will be clearly and completely described with reference to the attached drawings. Obviously, the described embodiment is only a part of the embodiment of the disclosure, but not the whole embodiment. Based on the embodiments in the present disclosure, all other embodiments obtained by ordinary technicians in the field without creative labor belong to the scope of protection of the present disclosure.

In order to make the above objectives, features and advantages of the present disclosure more obvious and easy to understand, the present disclosure will be further described in detail with the attached drawings and specific implementation methods.

Embodiment 1

Figure 1:
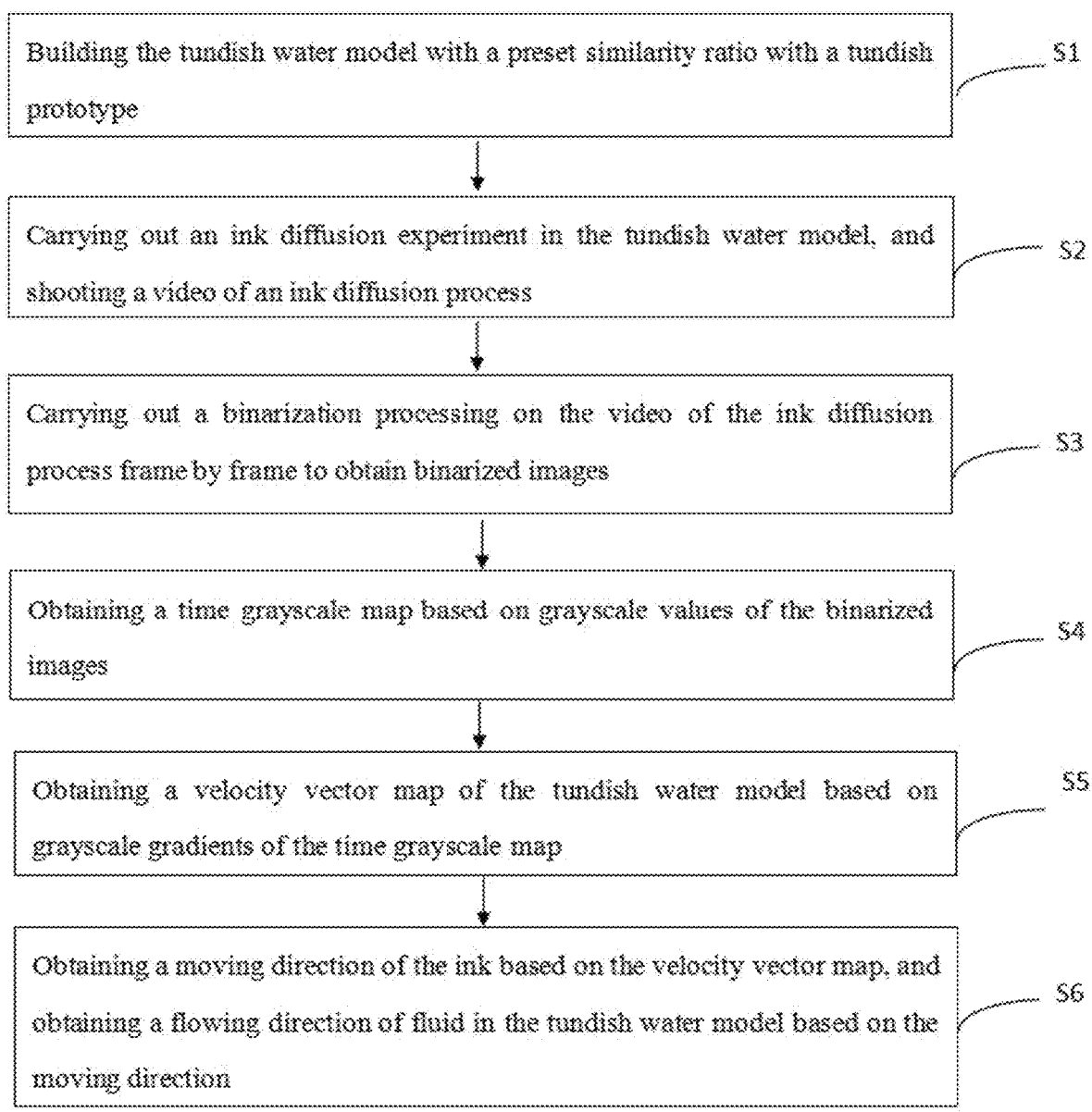
FIG. 1 is a flow chart of a method for obtaining the fluid flow directions of a tundish water model according to an embodiment of the present disclosure.

As shown in FIG. 1, a method for obtaining fluid flow directions of a tundish water model includes the following steps.

S1, the tundish water model is built with a preset similarity ratio with a tundish prototype; the similarity ratio between tundish water model and prototype is generally between 1/5 and 1/1.

In a further implementation, the preset similarity ratio includes a preset geometric similarity ratio and a preset dynamic similarity ratio;
the preset geometric similarity ratio enables geometric dimensions of the tundish prototype and the tundish water model to meet a preset ratio; and
the preset dynamic similarity ratio enables Froude numbers of the tundish prototype and the tundish water model to be the same.

Figure 2A:
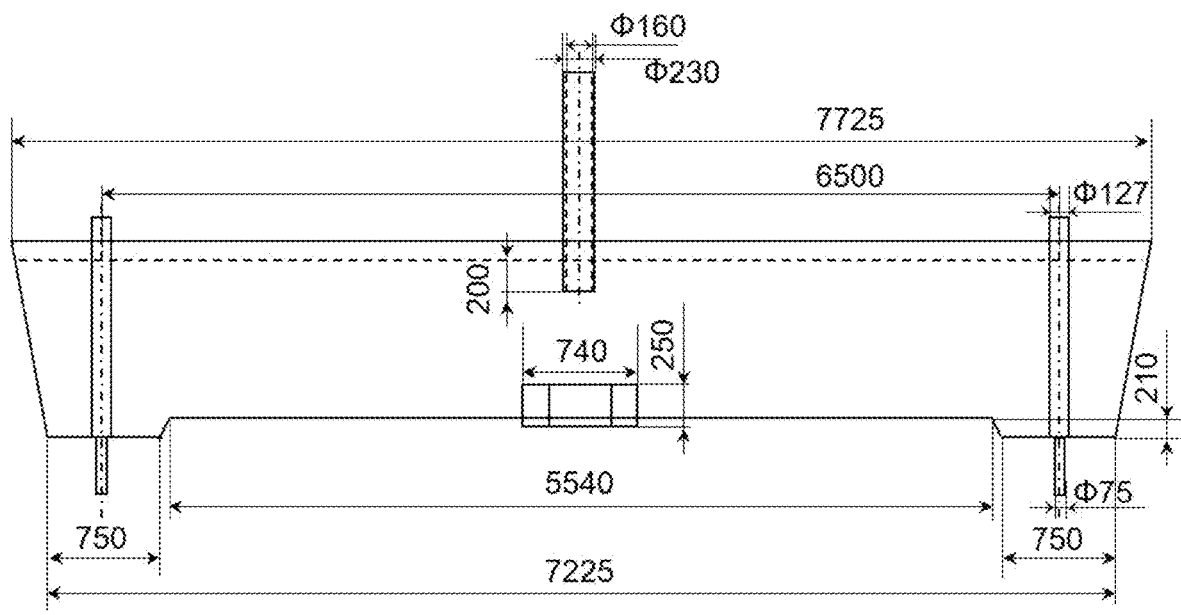
FIG. 2A is a front view of the structure and dimensions of the tundish prototype according to an embodiment of the present disclosure.
Figure 2B:
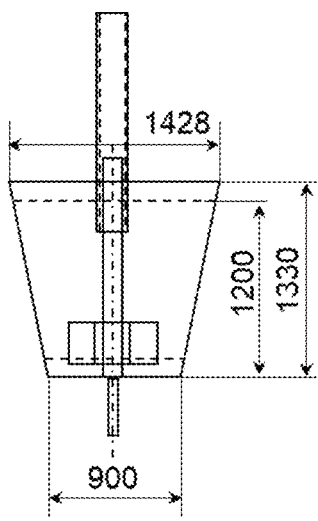
FIG. 2B is a side view of the structure and dimensions of the tundish prototype according to an embodiment of the present disclosure.
Figure 2C:
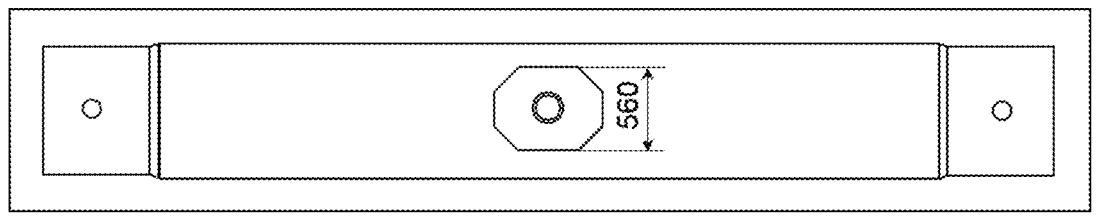
FIG. 2C is a top view of the structure and dimensions of the tundish prototype according to an embodiment of the present disclosure.

In this embodiment, a physical model of the tundish with a similarity ratio of 1:4 is established with a two-strand casting slab IF steel continuous casting tundish in a steel plant as the prototype and acrylic plexiglass as the material. FIG. 2A, FIG. 2B and FIG. 2C are the front view, the side view and the top view of the structure and dimensions of the tundish prototype, respectively, including 1—tundish body, 2—long nozzle, 3—turbulence inhibitor and 4—stopper rod, 5—outlet nozzle.

The theoretical basis of physical model is similarity theory, including geometric similarity and dynamic similarity. Geometric similarity means that the geometric dimensions of the prototype and model of tundish meet a certain ratio $\lambda$. For dynamic similarity, because the main forces in the flow process of tundish are inertial force, gravity and viscous force, and the corresponding criteria are Reynolds number (Re) and Froude number (Fr), dynamic similarity needs to satisfy that the corresponding two criteria of model and prototype are equal. According to the similarity theory, when the fluid flow is in the second self-modeling region, that is, when Re>$1\times10^4$–$1\times10^5$, the difference of Reynolds number between the model and the prototype may be ignored, and only the Froude number needs to be equal. After calculation, the Reynolds number of the fluid flow process in the tundish is basically in the second self-modeling region, so this embodiment only needs to satisfy that the Fr number of the model and the prototype is equal to ensure the dynamic similarity, that is, the formula of the preset dynamic similarity ratio is as follows:

$$Fr_m = \frac{v_m^2}{g_m L_m} = \frac{v_p^2}{g_p L_p} = Fr_p \quad (1)$$

in the formula, v is the fluid velocity; g is the acceleration of gravity; L is the characteristic length; m stands for tundish water model, p stands for tundish prototype, and Fr is Froude number.

Substituting the formula with similarity ratio $\lambda = L_m/L_p$ and flow rate $Q = \pi r v d^2/4$, obtaining:

$$Q_m = \lambda^{\frac{5}{2}} Q_p \quad (2)$$

in the formula, Q is the fluid flow rate, with the unit of m$^3$/s; $\lambda$ is the scale factor, which is 1:4 in this embodiment.

In the actual production process of a steel plant, the capacity of tundish is 62 t, and molten steel is 60 t or 50 t during production, and the corresponding liquid level height is 1200 mm when molten steel is 60 t, 1000 mm when molten steel is 50 t, and the immersion depth of long nozzle is in the range of 150-350 mm. The casting slab section sizes of two casting machines are 230×900-1600 mm and 230×1100-2150 mm respectively, and the casting speed is 0.9-1.7 m/min. The actual production conditions simulated in this disclosure are as follows: molten steel is poured into the tundish for 60 t, the liquid level is 1200 mm, the immersion depth of the long nozzle is 250 mm, and the section size of the casting slab is 230×1500 mm. Under the above conditions, it may be calculated from formula (3) that the casting speed is in the range of 0.9-1.7 m/min, and the flow rate of the tundish water model is in the range of 615.46-1,162.53 L/h. In order to adjust the flow rate conveniently in the experiment, 800 L/h in the middle position is selected as the experimental flow rate.

$$Q_m = \lambda^{\frac{5}{2}} Q_p =$$

$$\lambda^{\frac{5}{2}} u A \frac{\rho_s}{\rho_l} = \left(\frac{1}{4}\right)^{\frac{5}{2}} \times u \times 0.23 \times 1.5 \times \frac{7400}{7000} \times 60 \times 1000 = 683.84 u \, L/h \quad (3)$$

in the formula, $Q_p$ and $Q_m$ respectively represent the fluid flow rate in the prototype and model, L/h; A is the cross-sectional area of the casting slab, with the unit of m$^2$; $\rho_s$ and $\rho_l$ are the densities of casting slab and molten steel, with the unit of kg/m$^3$, respectively; u is the casting speed, with the unit of m/min.

S2, the experiment of ink diffusion is carried out in the tundish water model, and the video of ink diffusion process is shot. As shooting the video, it should be noted that: before starting the shooting, ensure the tundish liquid level is stable to prevent the fluctuation of liquid level from affecting the shooting results during the process. In order to prevent the subsequent processing from being affected, the shot video should include the whole process from the addition of ink to the ink diffusion in the entire tundish, and the shooting time depends on the capacity and flow rate of the tundish water model, which is about half of the ratio of capacity to flow rate. The frame rate of video shooting should not be too large or too small. Too large will lead to too long processing time, and too small will lead to low accuracy of the results. The frame rate may be between 5 and 20 due to the influence of flow rate. The amount of ink added should not be too small, too small amount of the ink will be diluted in the tundish, resulting in unclear ink display in the video, so the amount of the ink should be greater than 10 mL. The shooting area should be larger than the area occupied by the water model, so as to prevent the area where the water model is located from being processed.

The experimental device used in this embodiment is shown in FIG. 2A, FIG. 2B and FIG. 2C, and the specific experimental process includes the following steps: (1) turning on the computer and the high-speed camera, connecting the high-speed camera with the computer, and turning on the computer software to set shooting parameters and shooting positions; (2) adding water into the tundish water model, and after the liquid level reaches the tundish liquid level, adjusting the flow rate of the long nozzle and the two submerged nozzles to be equal to keep the liquid level stable; (3) turning on and debugging the lights to keep the shooting area bright, and at the same time, shading the experimental environment to prevent the influence of natural light; (4) adding 25 mL of ink at the long nozzle to shoot the whole process of ink diffusion in the tundish; (5) exporting the video after shooting, and using MATLAB algorithm to post-process the video.

S3, the binarization processing is carried out on the video of the ink diffusion process frame by frame to obtain binarized images.

In a further implementation, the video in the ink diffusion process is binarized frame by frame, and the method for obtaining the binarized images is as follows:

MATLAB software is used to read the video files obtained from the ink experiment, and at the same time the total number of frames of the video is obtained. Each frame of the vodio is read separately in the video, then each frame is renamed and saved in a folder.

From all the extracted images, a frame at a moment before adding ink in the video of the ink diffusion process is obtained.

Because the larger the RGB values, the lighter and brighter the color is, RGB values of each frame at a moment after adding the ink is subtracted from RGB values of the frame at the moment before adding the ink to obtain RGB results.

Based on the range value of RGB and the RGB results, the images with the background removed are obtained; specifically, the result obtained is subtracted from 255 (the range of RGB values is 0-255), thus removing the background of the water model.

The ink distribution maps are re-obtained at different moments based on the images with the background removed.

Figure 3A:
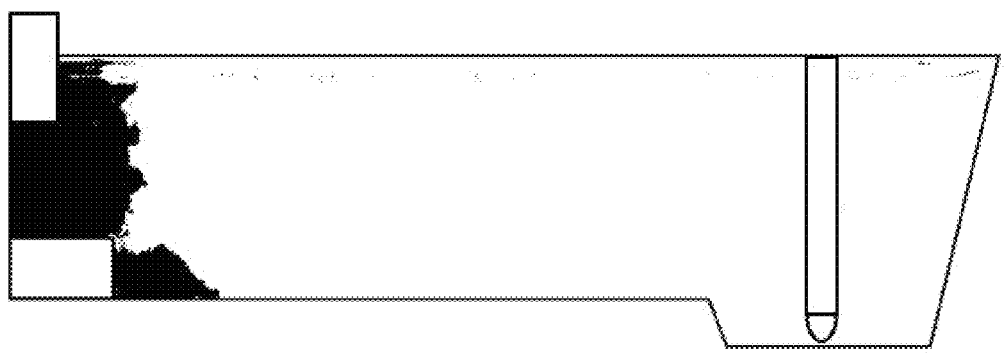
FIG. 3A is a binarized image of the ink distribution in the tundish at 1 second (s).
Figure 3B:
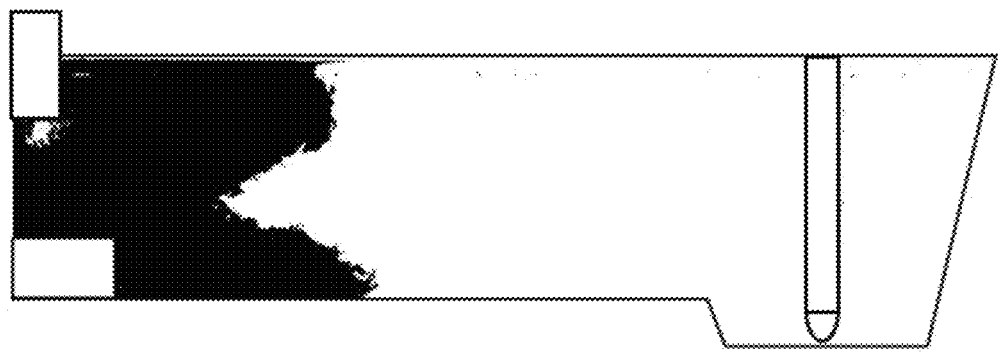
FIG. 3B is a binarized image of the ink distribution in the tundish at 5 s.
Figure 3C:
FIG. 3C is a binarized image of the ink distribution in the tundish at 10 s.
Figure 3D:
FIG. 3D is a binarized image of the ink distribution in the tundish at 20 s.
Figure 3E:
FIG. 3E is a binarized image of the ink distribution in the tundish at 30 s.
Figure 3F:
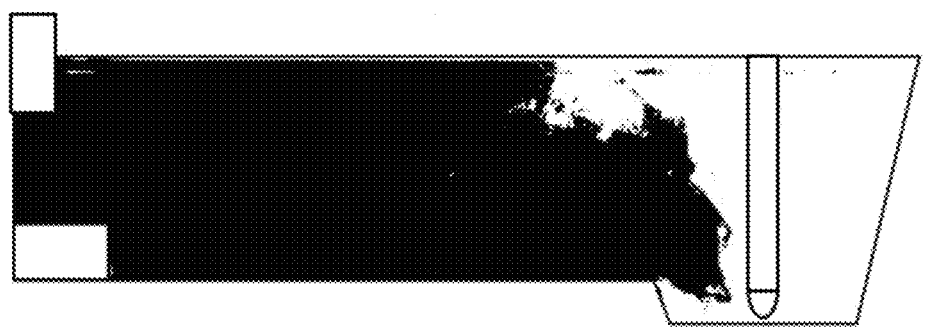
FIG. 3F is a binarized image of the ink distribution in the tundish at 40 s.
Figure 3G:
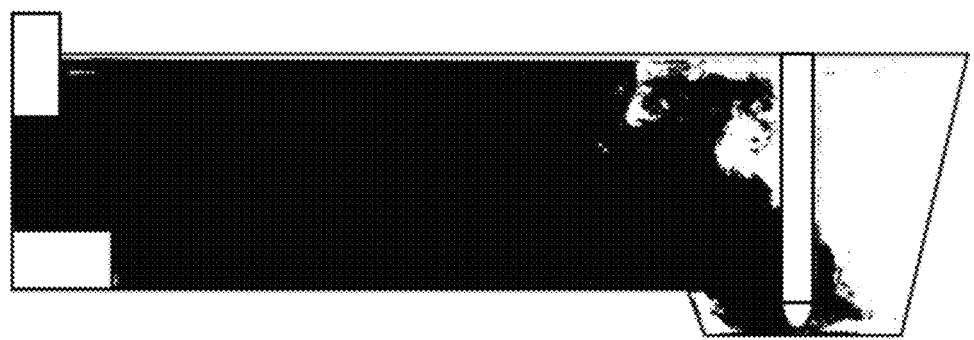
FIG. 3G is a binarized image of the ink distribution in the tundish at 60 s.
Figure 3H:
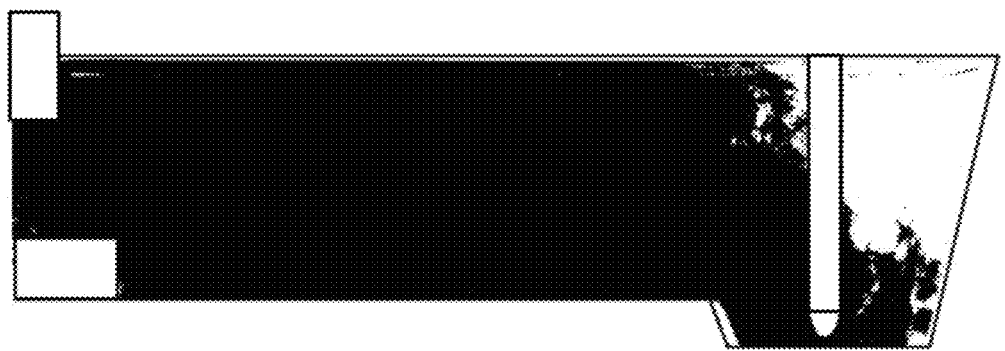
FIG. 3H is a binarized image of the ink distribution in the tundish at 80 s.
Figure 3I:
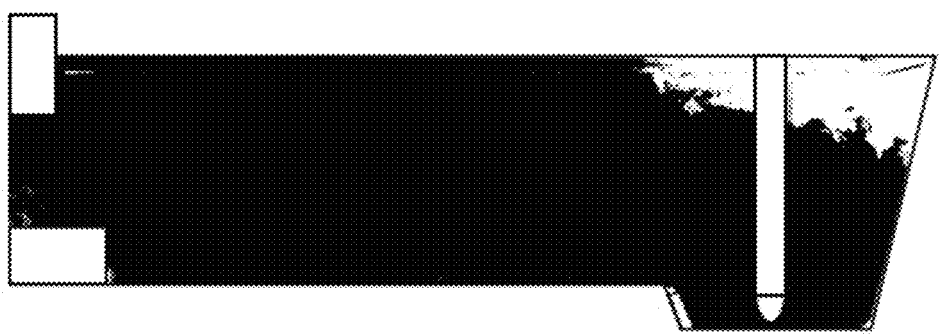
FIG. 3I is a binarized image of the ink distribution in the tundish at 120 s.
Figure 3J:
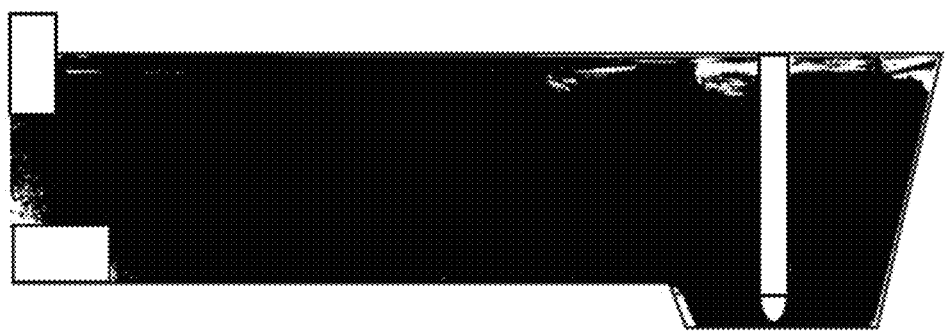
FIG. 3J is a binarized image of the ink distribution in the tundish at 160 s.

Based on the preset grayscale threshold, values of different grayscale areas in the ink distribution map at different moments are assigned to obtain binarized images. Specifically, according to a certain threshold, the area with smaller grayscale is set to 0, that is, pure black, and the area with larger grayscale is set to 255, that is, pure white. The threshold is obtained from each image by the imbinarize function of MATLAB software according to the maximum between-class variance method, that is, a certain grayscale value is set to maximize the gray variance between the black and white areas after binarization in the image. The results are shown in FIG. 3A-FIG. 3J. Among them, FIG. 3A is a binarized image of the ink distribution in the tundish at 1 s; FIG. 3B is a binarized image of ink distribution in tundish at 5 s; FIG. 3C is a binarized image of the ink distribution in the tundish at 10 s; FIG. 3D is a binarized image of the ink distribution in the tundish at 20 s; FIG. 3E is a binarized image of the ink distribution in the tundish at 30 s; FIG. 3F is a binarized image of the ink distribution in the tundish at 40 s; FIG. 3G is a binarized image of the ink distribution in the tundish at 60 s; FIG. 3H is a binarized image of the ink distribution in the tundish at 80 s; FIG. 3I is a binarized image of the ink distribution in the tundish at 120 s; FIG. 3J is a binarized image of the ink distribution in the tundish at 160 s.

S4, based on the grayscale values of the binarized images, a time grayscale map is obtained.

In a further implementation, the binarized images of the ink distribution map at different moments are concentrated on an image according to the grayscale values increasing with time to obtain the time grayscale map.

Figure 4:
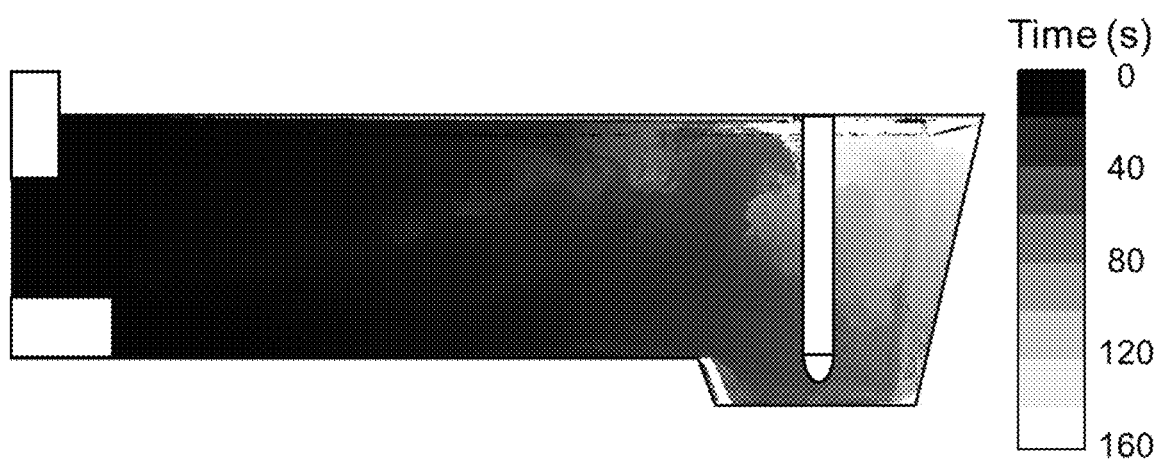
FIG. 4 is a time grayscale distribution map of the area occupied by ink in the tundish according to an embodiment of the present disclosure.

In this embodiment, according to the binarization map of the area occupied by ink at different moments, the binarized images may be concentrated on one map according to different times. At each moment, the area occupied by ink will move forward. If the grayscale of the area that is more than the previous moment increases linearly with time, that is, the color becomes lighter gradually, the grayscale map as shown in FIG. 4 may be obtained.

S5, a velocity vector map of the tundish water model is obtained based on grayscale gradients of the time grayscale map; and S6, a moving direction of the ink is obtained based on the velocity vector map, and a flowing direction of fluid in the tundish water model is obtained based on the moving direction In a further implementation, the method for obtaining the moving direction of the ink based on the grayscale gradients of the time grayscale map is as follows:

carrying out finite splitting on the pixels of the time grayscale map to obtain a plurality of grids;

calculating a grayscale average value of each of the grids;

based on the grayscale average value, adopting a principle of minimum grayscale gradient, and obtaining a grid with a minimum grayscale value as a first grid within a preset grid range;

comparing grayscale gradients of a grid opposite to the first grid to obtain a grid with a smallest grayscale gradient with the first grid as a second grid; and connecting an arrow between the first grid and the second grid to obtain the moving direction of the ink.

Figure 5:
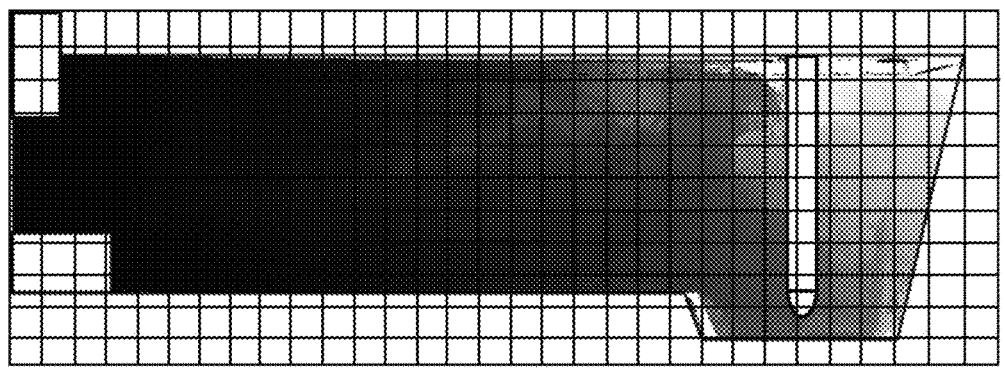
FIG. 5 is a schematic diagram of dividing grids according to an embodiment of the present disclosure.

Specifically, in this embodiment, in order to obtain the direction of the flow field, finite splitting is carried out on the number of pixels of the tundish image, as shown in FIG. 5, each unit may be neither too big nor too small, too large will lead to the result being not fine enough, and too small will lead to confusion in the direction of the arrow. The resolution of the tundish image used in this disclosure is 600×1680, and the pixel size of each unit is 30×30, and in this way, the image is divided into 20×56 grids, and the average grayscale in each square may be obtained according to FIG. 5.

Figure 6A:
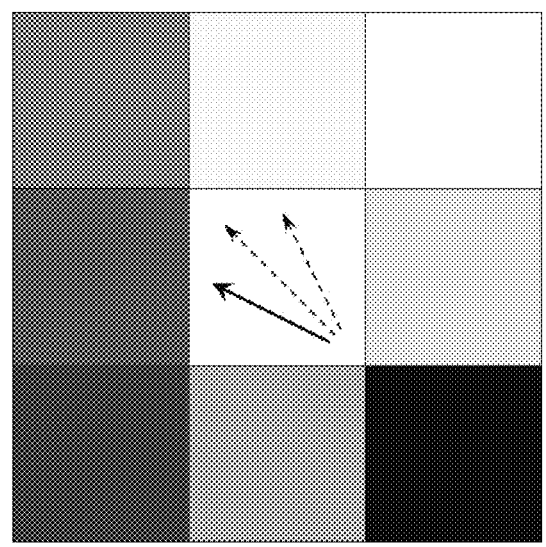
FIG. 6A is a schematic diagram of the principle of obtaining a vector at the diagonal according to an embodiment of the present disclosure.
Figure 6B:
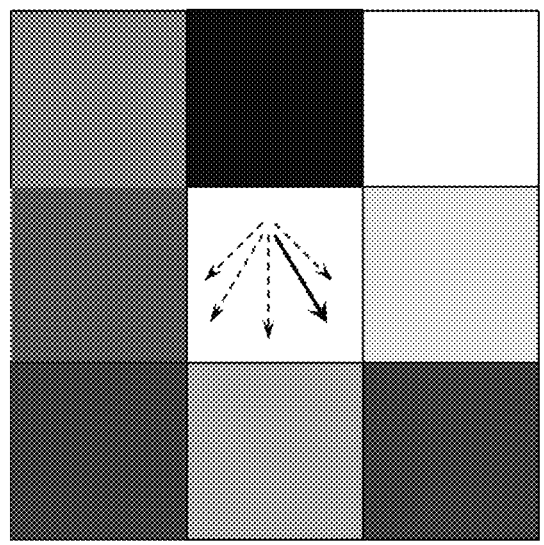
FIG. 6B is a schematic diagram of the principle of obtaining a vector at the cross according to an embodiment of the present disclosure.
Figure 7:
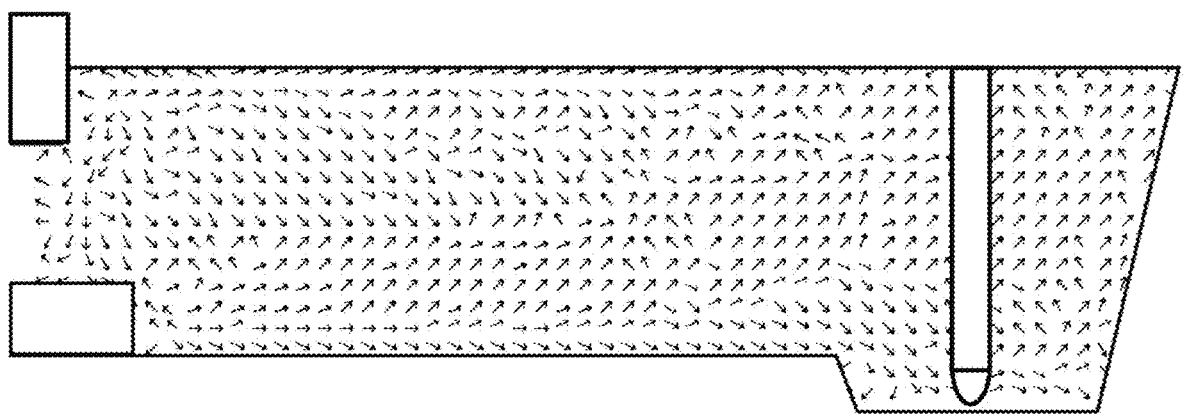
FIG. 7 is a vector map of the tundish water model according to an embodiment of the present disclosure.

The principle of minimum grayscale gradient is used to select the direction. In 20×56 grids, there are 8 grids around each grid from (2,2) to (19,55). The grid (the first grid) with the smallest grayscale value among the eight grids is found out, and the grayscale gradients of several grids opposite to this grid are compared to find out the grid (the second grid) with the smallest grayscale gradient between the original grids, and corresponding arrow are made, as shown by the solid arrows in FIG. 6A and FIG. 6B. If the grid with the smallest grayscale is at the diagonal, there are three grids opposite the grid with the smallest grayscale, as shown in FIG. 6A. When calculating the gradient, the grayscale difference is divided by $\sqrt{5}, 2\sqrt{2}, \sqrt{5}$; respectively. If the grid with the smallest grayscale is at the cross, there are five grids opposite the grid with the smallest grayscale, as shown in FIG. 6B. When calculating the gradient, the grayscale difference is divided by $\sqrt{2}, \sqrt{5}, 2, \sqrt{5}, \sqrt{2}$; respectively, so there are 32 directions. For the tundish with only turbulence suppressor, the final velocity vector map is shown in FIG. 7.

Embodiment 2

The disclosure also provides a system for obtaining the fluid flow directions of the tundish water model, which is used for realizing the method described in Embodiment 1, and includes the following steps:
- a model building module, used for building a tundish water model with a preset similarity ratio with a tundish prototype;
- a diffusion experiment module, used for carrying out an ink diffusion experiment in the tundish water model, and shooting a video of an ink diffusion process; and
- a binarization processing module, used for carrying out a binarization processing on the video of the ink diffusion process frame by frame to obtain binarized images.

In a further implementation, the binarization processing module includes:
- a frame obtaining unit, used for obtaining a frame at a moment before adding ink in the video of the ink diffusion process;
- an RGB obtaining unit, used for subtracting RGB values of each frame at a moment after adding the ink from RGB values of the frame at the moment before adding the ink to obtain RGB results;
- a background removing unit, used for obtaining images with background removed based on a range value of RGB and the RGB results;
- an ink distribution map obtaining unit, used for re-obtaining ink distribution maps at different moments based on the images with the background removed; and
- a binarization unit, used for assigning values to different grayscale areas in the ink distribution maps at different moments based on a preset grayscale threshold to obtain the binarized images.

A grayscale module, used for obtaining a time grayscale map based on grayscale values of the binarized images;
- a velocity vector map obtaining module, used for obtaining a velocity vector map of the tundish water model based on grayscale gradients of the time grayscale map; and
- an ink moving direction obtaining module, used for obtaining a moving direction of the ink based on the velocity vector map, and obtaining the fluid flow directions in the tundish water model based on the moving direction.

The above-mentioned embodiments form only a description of the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A method for obtaining fluid flow directions of a tundish water model, comprising following steps:
   building the tundish water model with a preset similarity ratio with a tundish prototype;
   carrying out an ink diffusion experiment in the tundish water model, and shooting a video of an ink diffusion process;
   carrying out a binarization processing on the video of the ink diffusion process frame by frame to obtain binarized images;
   wherein a method for obtaining the binarized images is as follows:
      obtaining a frame at a moment before adding ink in the video of the ink diffusion process;
      subtracting RGB values of each frame at a moment after adding the ink from RGB values of the frame at the moment before adding the ink to obtain RGB results;
      obtaining images with background removed based on a range value of RGB and the RGB results;
      re-obtaining ink distribution maps at different moments based on the images with the background removed; and
      assigning values to different grayscale areas in the ink distribution maps at different moments based on a preset grayscale threshold to obtain the binarized images;
   obtaining a time grayscale map based on grayscale values of the binarized images;
      wherein a method for obtaining the time grayscale map is as follows:
         concentrating the binarized images of the ink distribution maps at different moments on an image according to the grayscale values increasing with time to obtain the time grayscale map;
   obtaining a velocity vector map of the tundish water model based on grayscale gradients of the time grayscale map; and
   obtaining a moving direction of the ink based on the velocity vector map, and obtaining a flowing direction of a fluid in the tundish water model based on the moving direction;
      wherein a method for obtaining the moving direction of the ink is as follows:
         carrying out finite splitting on pixels of the time grayscale map to obtain a plurality of grids;
         calculating a grayscale average value of each of the grids;
         based on the grayscale average value, adopting a principle of minimum grayscale gradient, and obtaining a grid with a minimum grayscale value as a first grid within a preset grid range;
         comparing grayscale gradients of a grid opposite to the first grid to obtain a grid with a smallest grayscale gradient with the first grid as a second grid; and
         connecting an arrow between the first grid and the second grid to obtain the moving direction of the ink.

2. The method for obtaining the fluid flow directions of the tundish water model according to claim 1, wherein the preset similarity ratio comprises a preset geometric similarity ratio and a preset dynamic similarity ratio;
   the preset geometric similarity ratio enables geometric dimensions of the tundish prototype and the tundish water model to meet a preset ratio; and
   the preset dynamic similarity ratio enables Froude numbers of the tundish prototype and the tundish water model to be same.

3. The method for obtaining the fluid flow directions of the tundish water model according to claim 2, wherein a formula of the preset dynamic similarity ratio is as follows:

$$Fr_m = \frac{v_m^2}{g_m L_m} = \frac{v_p^2}{g_p L_p} = Fr_p,$$

in the formula, v is fluid velocity; g is acceleration of gravity; L is characteristic length; m stands for the tundish water model, p stands for the tundish prototype, and Fr is Froude number.

4. A system for obtaining fluid flow directions of a tundish water model, wherein the system is used for realizing the method according to claim 1, comprising:
- a model building module, used for building the tundish water model with the preset similarity ratio with the tundish prototype;
- a diffusion experiment module, used for carrying out the ink diffusion experiment in the tundish water model, and shooting the video of the ink diffusion process;
- a binarization processing module, used for carrying out the binarization processing on the video of the ink diffusion process frame by frame to obtain the binarized images;
- a grayscale module, used for obtaining the time grayscale map based on the grayscale values of the binarized images;
- a velocity vector map obtaining module, used for obtaining the velocity vector map of the tundish water model based on the grayscale gradients of the time grayscale map; and
- an ink moving direction obtaining module, used for obtaining the moving direction of the ink based on the velocity vector map, and obtaining the fluid flow directions in the tundish water model based on the moving direction.

5. The system for obtaining the fluid flow directions of the tundish water model according to claim 4, wherein the binarization processing module comprises:
- a frame obtaining unit, used for obtaining a frame at the moment before adding the ink in the video of the ink diffusion process;
- an RGB obtaining unit, used for subtracting the RGB values of each frame at the moment after adding the ink from the RGB values of the frame at the moment before adding the ink to obtain the RGB results;
- a background removing unit, used for obtaining the images with the background removed based on the range value of RGB and the RGB results;
- an ink distribution map obtaining unit, used for re-obtaining the ink distribution maps at different moments based on the images with the background removed; and
- a binarization unit, used for assigning the values to different grayscale areas in the ink distribution maps at different moments based on the preset grayscale threshold to obtain the binarized images.

* * * * *